Patented Nov. 6, 1928.

1,690,688

UNITED STATES PATENT OFFICE.

ERNEST E. LINDSEY, OF SAN FRANCISCO, CALIFORNIA.

COMPOUND FOR BREAD MAKING.

No Drawing.   Application filed March 23, 1927. Serial No. 177,843.

This invention relates to a compound for use in the manufacture of bread, and more particularly a bread containing a high percentage of cheese. The use of cheese in bread, while known to have advantages in the way of improving the flavor and increasing the nutrient value of the bread, has not heretofore come into general use because of the difficulty in evenly and uniformly disseminating the cheese throughout the dough, with the result that a very spotty loaf of bread is produced, having a pitted crust and containing large chunks of undissolved cheese scattered throughout the bread. This not only makes a rather unsightly loaf, but one which is liable to deteriorate very quickly, due to development of mold.

It is the object of the present invention to produce a sterilized and homogeneous compound containing the usual ingredients entering into bread-making, except the yeast and flour, and containing also a high percentage of cheese, the cheese being thoroughly dissolved and dissemiated with the other ingredients of the compound.

Because of the manner in which the cheese content is introduced, the bread has a uniform texture, in that the cheese is evenly distributed throughout the bread, and likewise the bread has a better appearance, better flavor, and better keeping qualities than if the cheese be added in separate form to the dough.

The preferred form of preparing the compound comprises the mixing of sugar, salt, and shortening components together, with the milk or other liquid, and bringing the same to a temperature where sterilization will occur, say of approximately 200° Fahrenheit. At this point cheese is added, and heat is applied to the mixture until the cheese is dissolved and thoroughly commingled with the other ingredients.

The proportions of the various ingredients in a preferred form include liquid, such as water or milk, or both, in the amount of 20 to 25 pounds; salt 3 to 4 pounds; sugar, 9 to 10 pounds; shortening, such as lard, 4 to 5 pounds. These are mixed and dissolved and heated to a sterilizing temperature, in the neighborhood of 200° Fahrenheit. While the mixture is at this temperature, finely-grated cheese in the amount of about 50 or 60 pounds is added. This, of course, will have the effect of lowering the temperature of the mixture, and the heat should be continued, so as to keep the mixture at approximately 150° to 170° Fahrenheit, until all of the cheese is dissolved and thoroughly mixed with the other ingredients. Also, at this time, a small quantity of flavoring and coloring matter may be added.

The mixture is then allowed to cool to a temperature of 120° or lower. At this time it may be desirable to grind the compound, to insure that the particles of cheese not sufficiently dissolved and disseminated are thoroughly broken up and commingled throughout the mixture. This can be conveniently done in an attrition grinder, for example.

It is then ready to be packaged. The final mixture assumes a semi-solid or paste-like form, and when put up in bottles or packages will keep indefinitely, due to the fact that it has been sterilized and made homogeneous.

It is used by the baker in the amount of about 30 pounds of the compound to each 100 pounds of flour, the baker adding also the yeast and such amount of liquid as may be necessary to properly form the dough.

By introducing the cheese into the compound in this manner, and thoroughly mixing it with the other ingredients while hot, there is produced a product not obtainable if the cheese should be introduced into the ordinary batch of dough in the usual course of bread-making, and without preliminary treatment.

In the latter event the cheese will not be evenly distributed throughout the dough, and will gather in spots, where it is likely to cause early deterioration of the bread. It will also produce a loaf whose crust is filled with holes or pits, and having a spotted appearance.

In and by the present method I eliminate the pits in the crust, and insure fine and even distribution of the cheese throughout the dough. The bread will therefore keep for long periods of time without deterioration, and will have a better texture and be of uniform quality.

The cheese used may be a skim milk cheese of an inexpensive grade. Inasmuch as it requires about 10 pounds of skimmed milk to produce one pound of cheese, and the preferable practice is to use about 20 pounds of such cheese to each 100 pounds of flour, it will readily be seen that the bread will be very high in nutrients, and that liquid or powdered milk, usually employed in large amounts in bread-making, may be dispensed with.

Various changes in the ingredients and proportions of the ingredients may be employed, without departing from the spirit of my invention as disclosed in the appended claims.

Having thus described my invention, what I claim as new and desire to secure by Letters Patent is:

1. A bread-making compound consisting of cheese, dissolved with the seasoning and shortening ingredients of bread, mixed at a temperature sufficient to bring about sterilization and dissolution, whereby to form a semi-solid or paste-like product, said compound having good keeping qualities and being capable of forming a cheese-flavored bread when combined with flour, yeast, and liquid.

2. A compound for use in making bread, consisting of salt, sugar, and shortening components of bread and a relatively large amount of cheese dissolved therewith, said compound having good keeping qualities and being capable of forming a cheese-flavored bread when combined with flour, yeast, and liquid.

3. A method of preparing a compound for bread-making, consisting of mixing and dissolving salt, sugar, and shortening components of the bread, heating the same to a temperature of approximately 200° Fahrenheit, adding thereto, in appreciable amount, grated cheese, while maintaining the temperature sufficiently high to dissolve and distribute the cheese evenly throughout the mixture, said compound having good keeping qualities and being capable of forming a cheese-flavored bread when combined with flour, yeast, and liquid.

4. A method of preparing a compound for bread-making, consisting of mixing with a solvent such amounts of salt, sugar, and shortening as are required for bread-making, heating this solution to a temperature of approximately 200° Fahrenheit, adding thereto a grated cheese in considerable quantity, maintaining the temperature at approximately 160° Fahrenheit until the cheese has been dissolved and evenly distributed throughout the mixture, and thereafter subjecting the mixture to a fine grinding, said compound having good keeping qualities and being capable of forming a cheese-flavored bread when combined with flour, yeast, and liquid.

ERNEST E. LINDSEY.